(12) United States Patent
De Vries et al.

(10) Patent No.: US 10,541,555 B2
(45) Date of Patent: Jan. 21, 2020

(54) SYSTEM AND METHOD OF REMOTE BRIDGING A UTILITY METER

(71) Applicant: Consolidated Edison Company of New York, Inc., New York, NY (US)

(72) Inventors: Troy De Vries, Mahwah, NJ (US); Paul Stergiou, Bayside, NY (US); Aris Kouyoumdjian, New York, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 31 days.

(21) Appl. No.: 15/877,606

(22) Filed: Jan. 23, 2018

(65) Prior Publication Data

US 2019/0229553 A1   Jul. 25, 2019

(51) Int. Cl.
*H02J 13/00* (2006.01)
*H02H 3/253* (2006.01)
*G05B 15/02* (2006.01)

(52) U.S. Cl.
CPC .......... *H02J 13/0017* (2013.01); *G05B 15/02* (2013.01); *H02H 3/253* (2013.01)

(58) Field of Classification Search
CPC ...... H02J 13/0017; G05B 15/02; H02H 3/253
See application file for complete search history.

(56) References Cited

U.S. PATENT DOCUMENTS

| | | | |
|---|---|---|---|
| 8,072,727 B2 | 12/2011 | O'Leary et al. | |
| 8,892,375 B2 | 11/2014 | Taft | |
| 2002/0130558 A1* | 9/2002 | Wattenburg | H02G 3/00 307/147 |
| 2009/0112375 A1 | 4/2009 | Popescu | |
| 2009/0187285 A1* | 7/2009 | Yaney | G08B 25/06 700/292 |
| 2012/0032533 A1* | 2/2012 | Kawamura | B60L 3/0061 307/327 |
| 2013/0229162 A1* | 9/2013 | Kromrey | G05F 1/12 323/282 |
| 2014/0233662 A1 | 8/2014 | Hansell et al. | |
| 2016/0072270 A1 | 3/2016 | Rostron et al. | |

* cited by examiner

*Primary Examiner* — Thomas C Lee
*Assistant Examiner* — Michael Tang
(74) *Attorney, Agent, or Firm* — Cantor Colburn LLP

(57) ABSTRACT

A system and method for controlling electrical power in a multi-phase electrical service to a load is provided. The system includes an electric meter that determines when an electrical characteristic of a phase of a multi-phase electrical service is below a threshold. A first switch and second switch are coupled to the first phase and second phase respectively and disconnect the phases from a power source. A bridging switch is coupled between the phases, the bridging switch being arranged between the load and the first and second switches. A controller is coupled between the electric meter, the first switch, the second switch, and the bridging switch. The controller causes the first switch to open in response to the electrical characteristic of the first phase being below the threshold and causing the bridging switch to close when the first switch is opened.

14 Claims, 9 Drawing Sheets

SYSTEM AND METHOD OF REMOTE BRIDGING A UTILITY METER

BACKGROUND

The subject matter disclosed herein relates to a system and method of monitoring, managing and controlling the flow of multi-phase electrical power to a facility.

Electrical utilities have a number of metrics that are used to track performance and customer satisfaction. These metrics, which include the system average interruption frequency index ("SAIFI"), the customer average interruption duration index ("CAIDI"), and for some utilities, the momentary average interruption frequency index ("MAIFI"). SAIFI measures the average number of interruptions that a customer would experience during a time period, such as a year. CAIDI measures the duration of the interruption that a customer would experience, and is generally a few hours per year. MAIFI measures the number of power interruptions that have a duration of less than five minutes that a customer would experience during a given time period.

Some or all of these metrics are also used by government regulators to aid in determining if the electrical utility is adhering to the regulations in maintaining a durable and reliable electrical distribution network. As a result, electrical utility and distribution companies have developed system architectures that minimize the duration and frequency of power outages.

It should be appreciated that as a result of these metrics, electrical utilities have incentive to maintain equipment in good operating order and to quickly determine when a condition occurs that is either impacting the distribution of electrical power or has the potential to effect reliability of the electrical network. Often conditions are monitored by utility personnel who visually inspect and perform measurements on electrical equipment and facilities where it is located. In a large metropolitan area, the electrical utility may maintain a large staff of utility personnel that are distributed over a wide geographic area. This staffing of utility personnel represents a large investment for the electrical utility and it may be difficult to cost effectively dispatch the utility personnel with the desired skills and tools in a rapid manner.

One type of outage that may occur is the loss of a single phase to a facility receiving multiple phases of electrical power (e.g. a two-phase or a three-phase service). When an issue arises with a single phase of the multi-phase service, the equipment or appliances supplied by that phase will cease operating.

Accordingly, while existing electrical power delivery systems are suitable for their intended purposes the need for improvement remains, particularly in providing the capability of remotely restoring one or more phases to a facility when a single phase loses electrical power.

BRIEF DESCRIPTION

According to one aspect of the disclosure a system for a system for controlling electrical power in a multi-phase electrical service to a load is provided. The system includes an electric meter that measures in operation an electrical characteristic of each phase of the multi-phase electrical service, the electric meter further being operable to determine when the electrical characteristic on a first phase and a second phase of the multi-phase electrical service is below a threshold. A first isolation switch is coupled to the first phase and arranged to disconnect the first phase from a power source. A second isolation switch is coupled to the second phase and arranged to disconnect the second phase from a power source. A bridging switch is coupled between the first phase and the second phase, the bridging switch being electrically arranged between the load and the first isolation switch and second isolation switch. A controller is coupled for communication between the electric meter, the first isolation switch, the second isolation switch, and the bridging switch. The controller includes a processor that is responsive to executable computer instructions to cause the first isolation switch to open in response to the electrical characteristic of the first phase being below the threshold and causing the bridging switch to close when the first isolation switch is opened. electrical power in a multi-phase electrical service to a load is provided. The method includes measuring an electrical characteristic of a plurality of electrical phases to a load, the plurality of electrical phases including a first phase and a second phase. The electrical characteristic is determined on the first phase is below a threshold. An isolation switch electrically coupled to the first phase is opened, the isolation switch being electrically coupled between a power source and the load. A bridging switch that is electrically coupled between the first phase and the second phase is closed after the opening of the isolation switch, the bridging switch being disposed between the isolation switches and the load.

According to another aspect of the disclosure a system for controlling electrical power in a multi-phase electrical service to a load is provided. The system includes an electric meter that measures in operation an electrical characteristic of each phase of the multi-phase electrical service, the electric meter further being operable to determine when the electrical characteristic on a first phase, a second phase, and a third phase of the multi-phase electrical service is below a threshold. A first isolation switch is coupled to the first phase and arranged to disconnect the first phase from a power source. A second isolation switch is coupled to the second phase and arranged to disconnect the second phase from a power source. A third isolation switch is coupled to the third phase and arranged to disconnect the third phase from a power source. A first bridging switch is coupled between the first phase and the second phase, the first bridging switch being electrically arranged between the load and the first isolation switch and second isolation switch. A second bridging switch is coupled between the second phase and the third phase, the second bridging switch being electrically arranged between the electric meter and the second isolation switch and the third isolation switch. A controller is coupled for communication between the electric meter, the first isolation switch, the second isolation switch, the third isolation switch, the first bridging switch, and the second bridging switch. The controller includes a processor that is responsive to executable computer instructions to cause the first isolation switch to open in response to the electrical characteristic of the first phase being below the threshold and causing the first bridging switch to close when the first isolation switch is opened.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present invention provide for a system that allows for the automated or intelligent remote monitoring of electrical conductors in a multi-phase electrical service. Embodiments of the present invention provide for the automated switching of electrical power from a first phase to a second phase in response to the second phase having an electrical characteristic below a threshold. Embodiments of the present invention provide further advantages in isolating the load in response to an electrical phase having an electrical characteristic below a threshold. The isolating of the load on the electrical phase being performed prior to electrically connecting the load to a different electrical phase.

Figure 1:
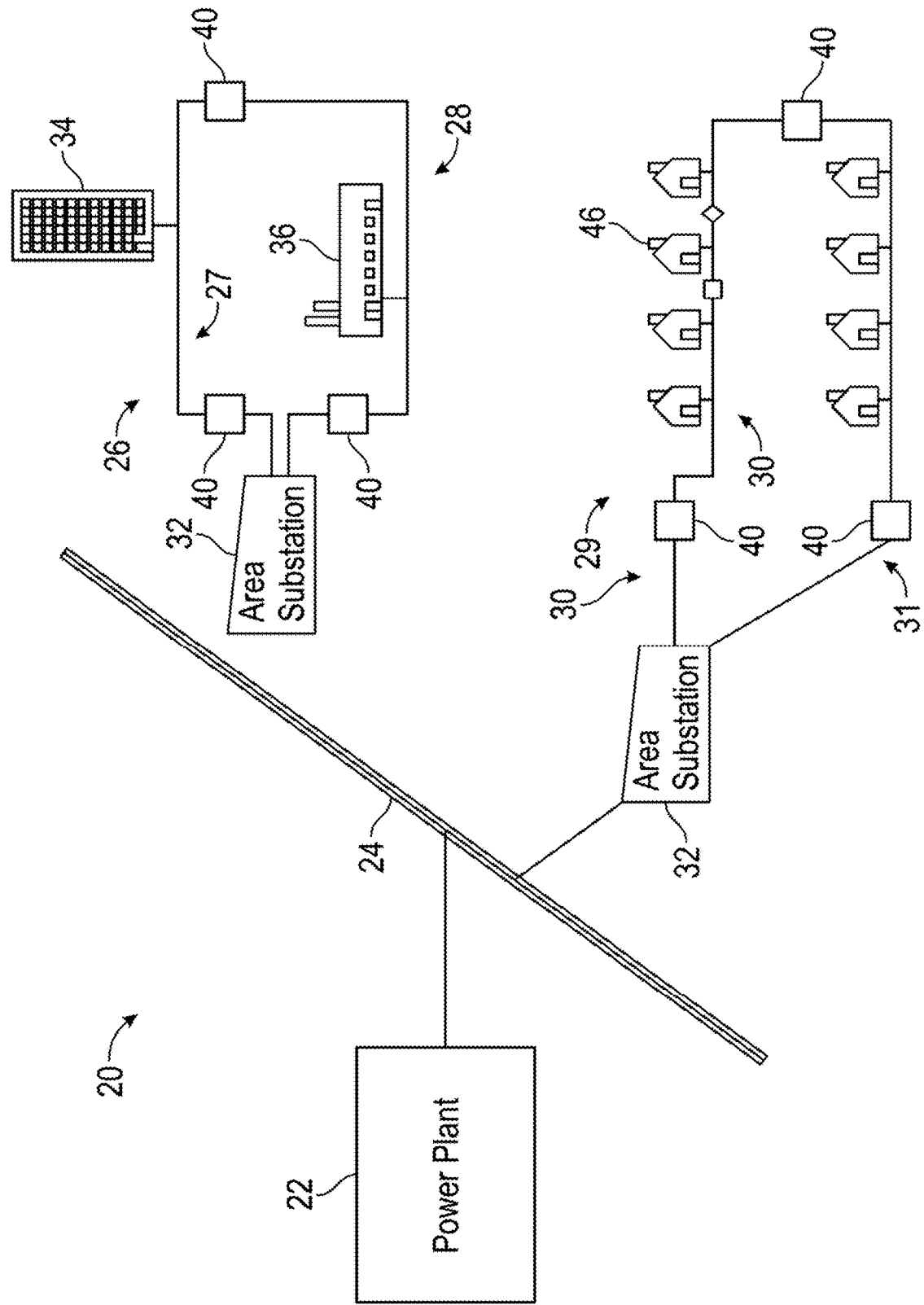
FIG. 1 is a schematic illustration of a utility electrical distribution system.

Referring now to FIG. 1, an embodiment is shown of a utility electrical distribution system 20. The utility system 20 includes one or more power plants 22 connected in parallel to a main transmission system 24. The power plants 22 may include, but are not limited to: coal, nuclear, natural gas, or incineration power plants. Additionally, the power plant 22 may include one or more facilities that generate electricity based on renewable energy sources, such as but not limited to hydroelectric, solar, or wind turbine power plants. It should be appreciated that additional components such as transformers, switchgear, fuses and the like (not shown) may be incorporated into the utility system 20 as needed to ensure the efficient operation of the system. The utility system 20 is typically interconnected with one or more other utility networks to allow the transfer of electrical power into or out of the electrical system 20.

The main transmission system 24 typically consists of high transmission voltage power lines, anywhere from 69 KV to 500 KV for example, and associated transmission and distribution equipment which carry the electrical power from the point of production at the power plant 22 to the end users located on local electrical distribution systems 26, 29. The local distribution systems 26, 29 are connected to the main distribution system by area substations 32 which reduce transmission voltage to distribution levels such as 13 KV, 27 KV or 33 KV. Area Substations 32 typically contain one or more transformers, switching, protection, and control equipment. Area Substations 32 all include circuit breakers to interrupt faults such as short circuits or over-load currents that may occur. Substations 32 may also include equipment such as fuses, surge protection, controls, meters, capacitors, and load tap changers for voltage regulation.

The area substations 32 connect to one or more local electrical distribution systems, such as local distribution system 26, for example, that provides electrical power to a commercial area having end users such as an office building 34 or a manufacturing facility 36. In an embodiment, the area substation 32 may have two or more feeder circuits that provide electrical power to different feeder circuit branches 27, 28 of the local distribution system 26.

The residential distribution system 29 includes one or more residential buildings 46 and light industrial or commercial operations. Similar to the commercial distribution network 26, the residential system 29 is divided into multiple branch feeders 30, 31 that are fed by the substation 32. In an embodiment, the local distribution system 29 is arranged such that approximately up to 6 MVA of power is provided on each branch circuit for electrical loads such as residential buildings.

It should be appreciated that the distribution systems 26, 29 may include facilities that receive multiple electrical phases. In these types of electrical service, the facility may be connected with three-conductors (two single phase conductors and a neutral conductor) or with four-conductors (three single phase conductors and a neutral conductor. The electrical conductors are connected to an electric utility meter that measures the electrical usage of each electrical phase.

Figure 2:
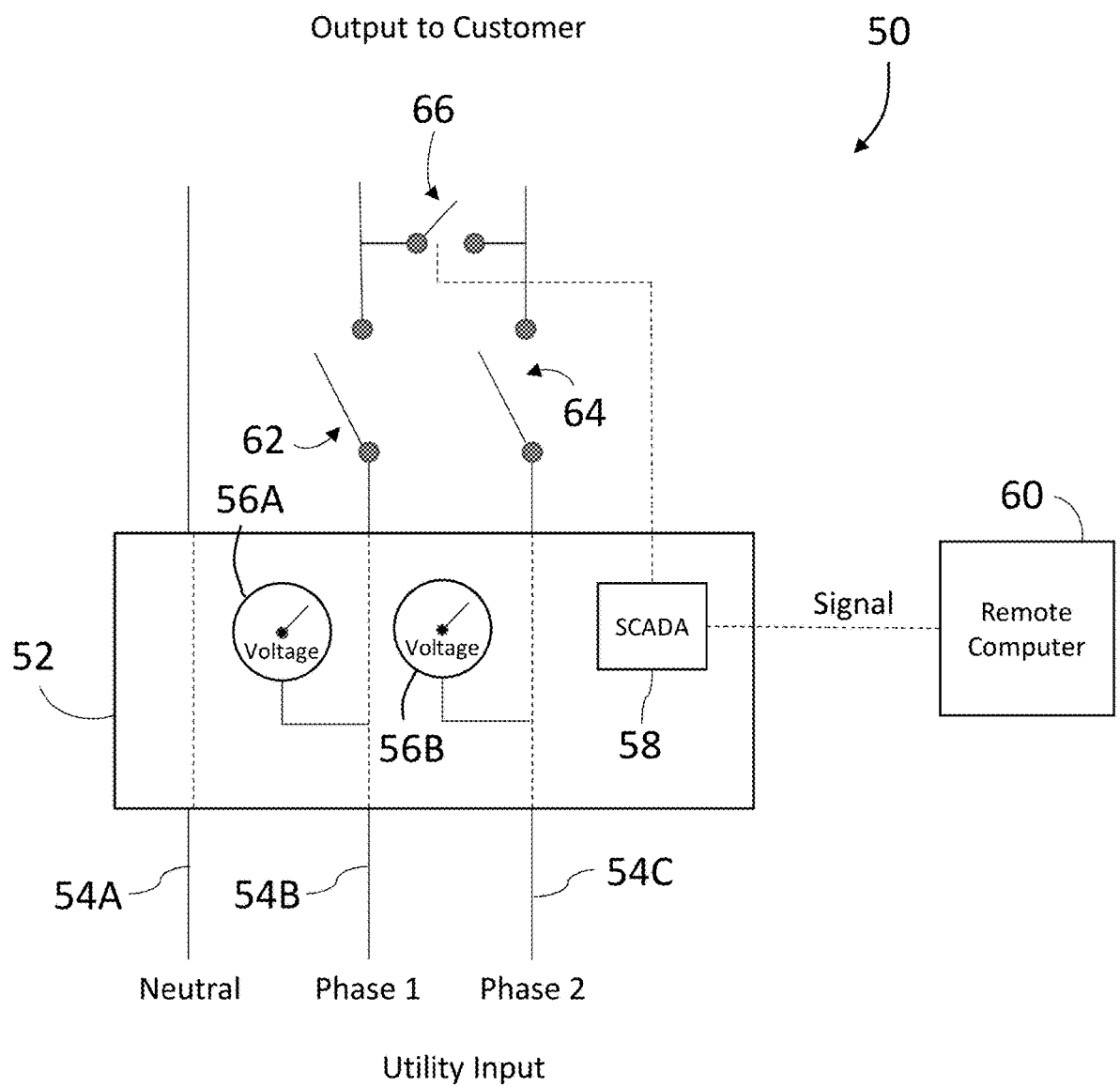
FIG. 2 is a schematic illustration of an electric utility meter having remote bridging capability for a two-phase service in accordance with an embodiment.

Referring now to FIG. 2, a schematic illustration is shown of a two-phase system 50. The system 50 includes an electric utility meter 52 that receives a plurality of input conductors 54A, 54B, 54C that connect the electric utility meter 52 to a power source, such as power plant 22 via the distribution networks 26, 29 for example. The conductor 54A is a neutral conductor, while conductors 54B, 54C are each a single electrical phase respectively. The electrical utility meter 52 includes sensors 56A, 56B that measure an electrical characteristic. In an embodiment, the sensors 56A, 56B are voltage sensors.

The electric utility meter 52 further includes a controller 58. In an embodiment, the controller 58 is a supervisory control and data acquisition (SCADA) system. The controller 58 that receives inputs from the sensors 56A, 56B, and in an embodiment a communications device. The communications device may be any wired or wireless communications device that allows the controller 58 to transmit and receive signals from a remote computer 60. The operation of system 20 is controlled by controller 58. Controller 58 is a suitable electronic device capable of accepting data and instructions, executing the instructions to process the data, and presenting the results. Controller 58 may accept instructions through a user interface, or through other means such as but not limited to electronic data card, voice activation means, manually-operable selection and control means, radiated wavelength and electronic or electrical transfer.

Controller 58 is capable of converting the analog voltage or current level provided by sensor(s) 56A, 56B into a digital signal indicative of an electrical characteristic of the conductors 54B, 54C, such as voltage levels. Alternatively, sensor(s) 56A, 56B may be configured to provide a digital signal to controller 58, or an analog-to-digital (A/D) converter maybe coupled between sensor(s) 56A, 56B and controller 58 to convert the analog signal provided by sensor(s) 56A, 56B into a digital signal for processing by controller 58. The digital signals act as input to various processes within controller 58 for purposes of controlling the system 20.

In general, controller 58 accepts data from sensor(s) 56A, 56B and is given certain instructions for the purpose of comparing the data from sensor(s) 56A, 56B to predetermined operational parameters. Controller 58 provides operating signals to the sensor(s) 56A, 56B, one or more switches 62, 64, 66, and the communications device. The controller 58 compares the operational parameters to predetermined variances (e.g. low voltage) and if the predetermined variance is exceeded, generates a signal that may be used to indicate an alarm to an operator or the remote computer 60. As described in more detail herein, in one embodiment, the controller 58 may be programed to automatically cause one of the isolation switches 62, 64 to open and the bridging switch 66 to close in response to an operating parameter exceeding the predetermined variance.

The data received from sensor(s) 56A, 56B may be displayed on a user interface coupled to controller 58. The user interface may be an LED (light-emitting diode) display, an LCD (liquid-crystal diode) display, a CRT (cathode ray tube) display, or the like. A keypad may also be coupled to the user interface for providing data input to controller 58.

In addition to being coupled to one or more components within device 56, controller 58 may also be coupled to external computer networks such as a local area network (LAN) and the Internet. The LAN interconnects one or more remote computers 60, which are configured to communicate with controller 58 using a well-known computer communications protocol such as TCP/IP (Transmission Control Protocol/Internet(ˆ) Protocol), RS-232, ModBus, and the like. In an embodiment, the LAN is connected to the Internet. This connection allows controller 58 to communicate with one or more remote computers connected to the Internet. In other embodiments, the LAN may be a wide-area-network, a cellular network, an advanced metering infrastructure (AMI) or the like.

Controller 58 includes a processing unit having a processor coupled to memory. The memory may include a random access memory (RAM) device and a read-only memory (ROM) device. A nonvolatile memory (NVM) may also be coupled to the processing unit. The processing unit may also include one or more input/output (I/O) controllers, and an interface device to connect the processing unit to the wireless communications device.

The ROM memory device stores an application code, e.g., main functionality firmware, including initializing parameters, and boot code, for processor. Application code also includes program instructions for causing processor to execute any system 20 operation control methods, including starting and stopping operation, monitoring predetermined operating parameters, generation of alarms, and actuation of switches 62, 64, 66.

NVM device is any form of non-volatile memory such as an EPROM (Erasable Programmable Read Only Memory) chip, a disk drive, or the like. Stored in NVM device are various operational parameters for the application code. The various operational parameters can be input to NVM device either locally, using a keypad or remote computer 60, or remotely via the Internet using remote computer 60. It will be recognized that application code can be stored in NVM device rather than ROM device.

Controller 58 includes operation control methods embodied in application code. These methods are embodied in computer instructions written to be executed by the processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

The controller 58 is electrically coupled to the sensors 56A, 56B and each of the switches 62, 64, 66. Each of the isolation switches 62, 64 are electrically coupled to the phase conductors 54B, 54C respectively. The isolation switches 62, 64 are configured to automatically move between a closed position and an open position in response to a signal from the controller 58. The isolation switches 62, 64 are positioned between the electric utility meter 52 and the end load. When in the open position, the isolation switches 62, 64 disconnected the load from the power source. It should be appreciated that the isolation switches 62, 64 may be actuated individually between the open and closed positions. During a normal operating state, the isolation switches 62, 64 are in the closed position to allow electrical power to flow from the power source to the load.

The bridging switch 66 is electrically coupled between the first phase conductor 54B and the second phase conductor 54C. In an embodiment, the bridging switch 66 is electrically coupled between the phases 54B, 54C at a position between the isolation switches 62, 64 and the load. It should be appreciated that positioning the bridging switch 66 between the isolation switches 62, 64 and the load prevents the feedback of electrical power onto the utility distribution system. The bridging switch 66 is configured to move between an open position and a closed position in response to a signal from the controller 58. In the normal operating state, the bridging switch 66 is in the open position.

In an embodiment, the isolation switches 62, 64 are each individually interlocked with the bridging switch 66. The interlock may be a mechanical or an electrical interlock. The interlock prevents the bridging switch 66 from closing when both of the isolation switches 62, 64 are also closed. In other words, at least one of the isolation switches 62, 64 must be in the open position prior to the bridging switch 66 closing.

Figure 7:
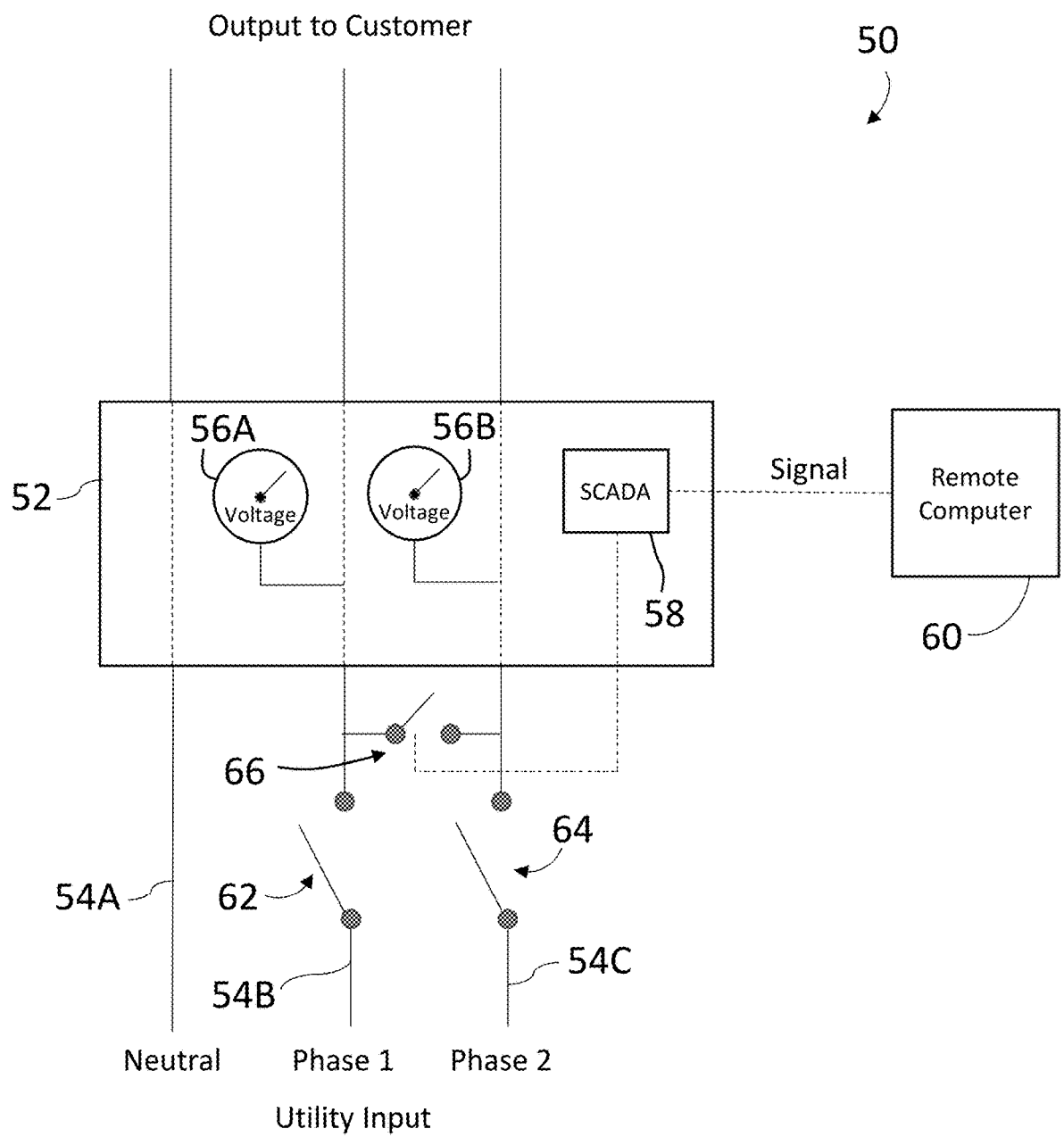
FIG. 7 is a schematic illustration of an electric utility meter having remote bridging capability with the isolation switches being positioned on an input side of the electric utility meter in accordance with an embodiment.
Figure 8:
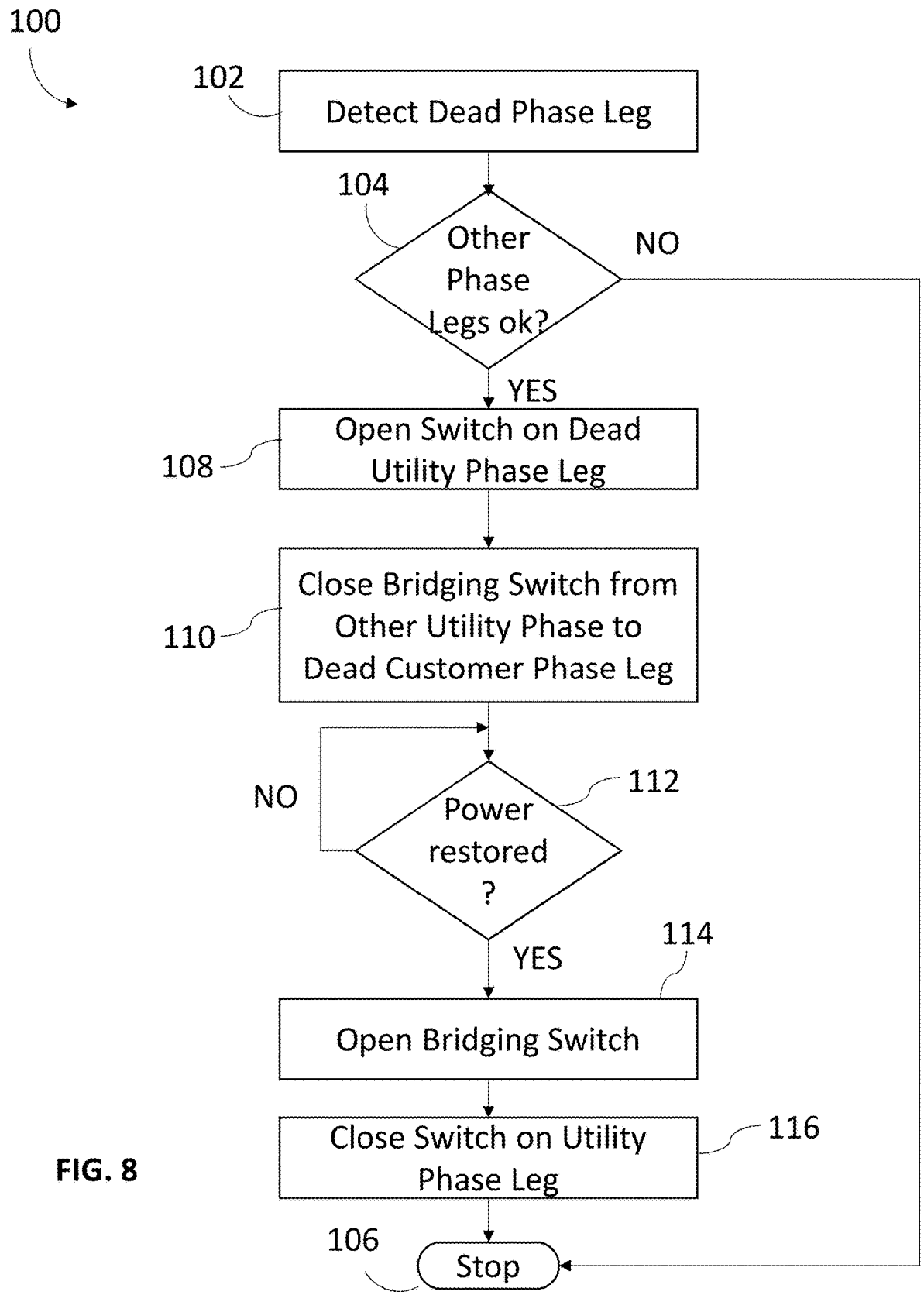
FIG. 8 is a flow diagram of a method of operating an electric utility meter having remote bridging capability in accordance with an embodiment.

It should be appreciated that in other embodiments, as shown in FIG. 7, the isolation switches 62, 64 may be electrically connected between the power source and the input side of the electric utility meter 52.

Figure 3:
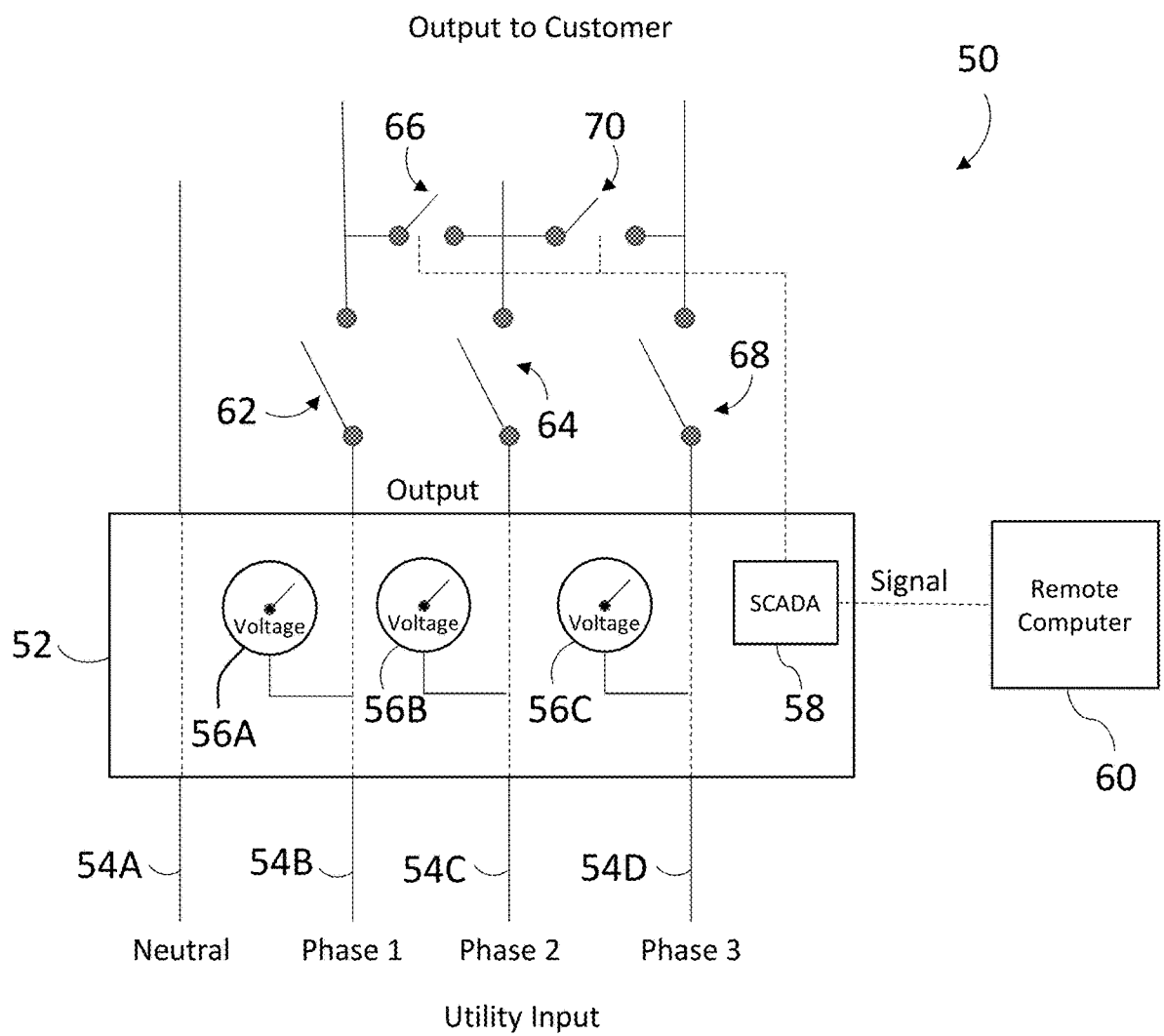
FIG. 3 is a schematic illustration of an electric utility meter having remote bridging capability for a three-phase service in accordance with an embodiment.

Referring now to FIG. 3, a three-phase system 50 is shown for connecting an electrical load (e.g. a building or facility) to the power source. The system 50 of FIG. 3 is similar to that illustrated in FIG. 2 except with the addition of a third phase conductor 54D. A third isolation switch 68 is electrically coupled to the third phase conductor 54D. The third isolation switch 68 is configured to move between an open position and a closed position in response to a signal from the controller 58. The third isolation switch 68 may be positioned between the output side of the electric utility meter 52 and the load, or between the power source and the input side of the electric utility meter 52. The third isolation switch 68 is in the closed position during normal operation.

The system 50 of FIG. 3 further includes a second bridging switch 70. In the illustrated embodiment, the second bridging switch 70 is disposed between the second phase conductor 54C and the third phase conductor 54D. It should be appreciated that in other embodiments, the second bridging switch 70 may be electrically coupled between the first phase conductor 54B and the third phase conductor 54D. The second bridging switch 70 is configured to be moved between an open position and a closed position in response to a signal from the controller 58.

Referring now to FIGS. 4-6 and FIG. 8, a method 100 shown of operating the system 50. The method 100 starts in block 102 where an interruption 74 (FIG. 4) in the flow of electrical power is detected in one of the phase conductors, such as phase conductor 54D. The detection of the interruption 74 may be performed by the sensor 56C, which measures an electrical characteristic of the phase conductor 54D. In the exemplary embodiment, the electrical characteristic is voltage. When the voltage is less than a predetermined threshold, it is considered a loss of electrical power on that phase conductor.

It should be noted that at the moment of the interruption 74, each of the isolation switches 62, 64, 68 are in the closed position to allow electrical power to flow from the power source to the electrical load. Thus, when the interruption 74 occurs, the electrical power will cease flowing to the load connected to the third phase conductor 54D.

Upon detection of the loss of electrical power in one of the phase conductors, the method 100 then proceeds to query block 104 where it is determined whether the interruptions were detected on other phase conductors. When the query block 104 returns a negative (multiple phases experiencing interruptions), then the method 100 proceeds to stop block 106. In an embodiment, as long as one of the phase conductors has electrical power, the query block 104 will return a positive.

Figure 5:
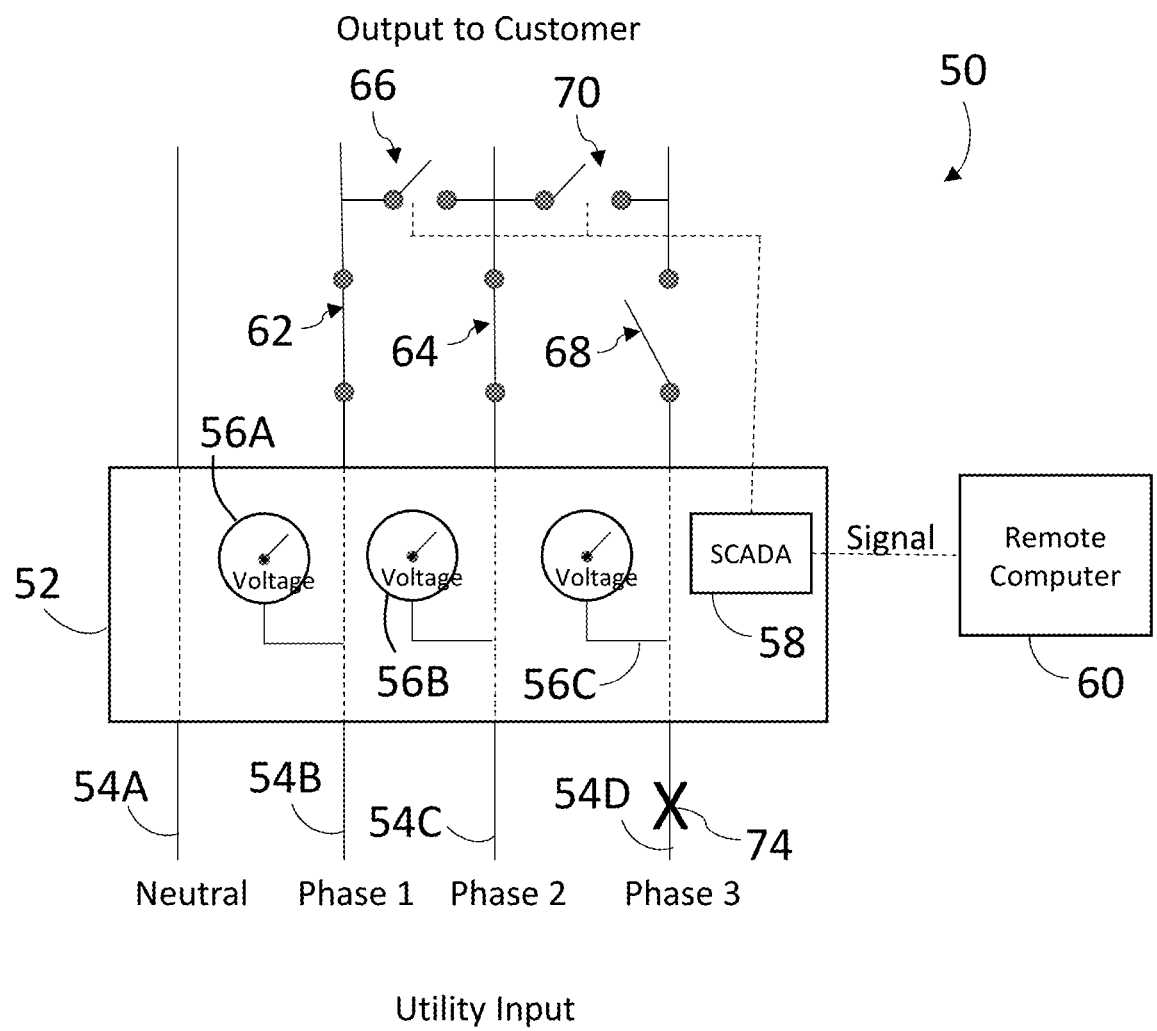
Figure 6:
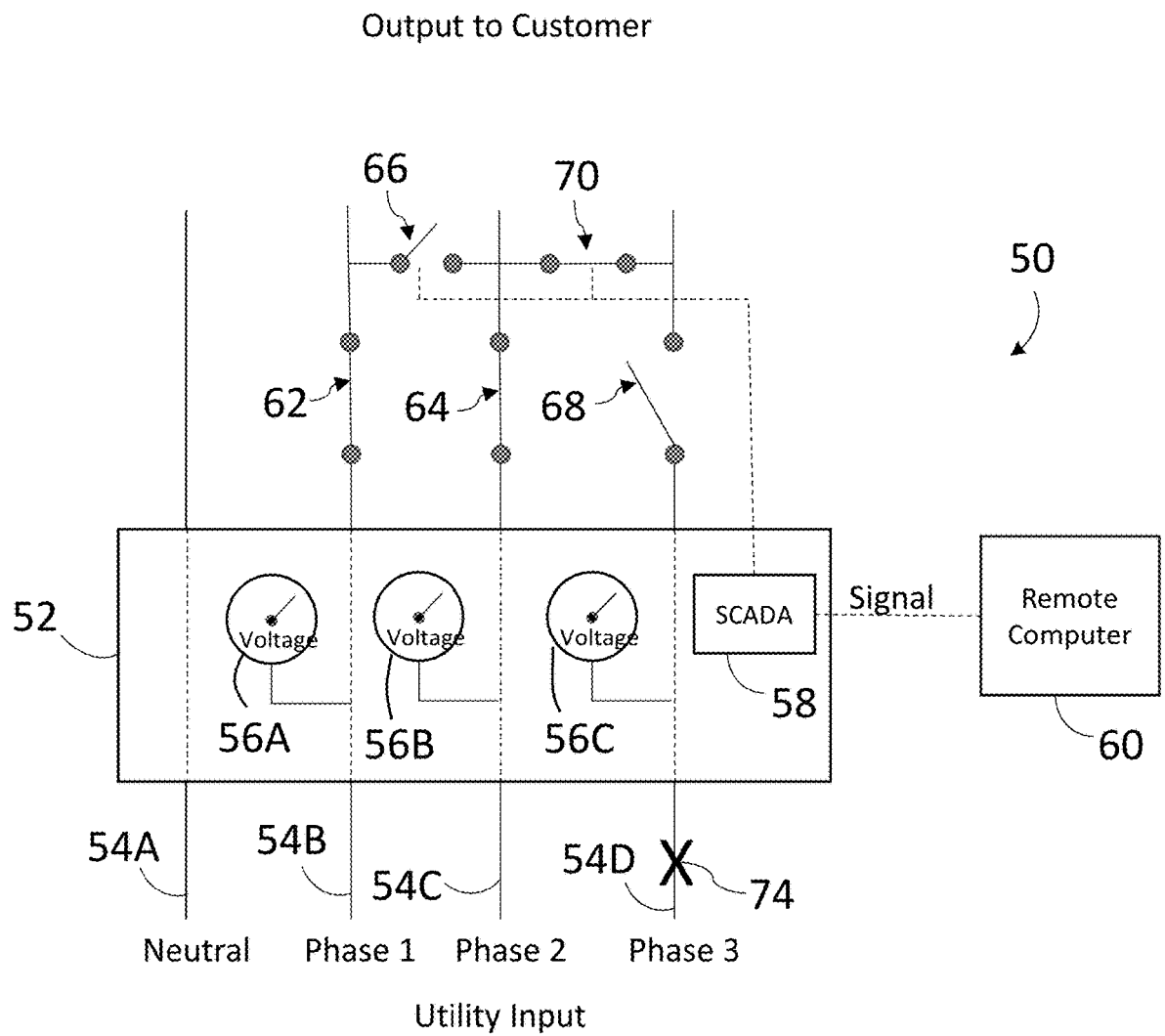

When the query block 104 returns a positive, the method 100 flows to block 108 where the isolation switch associated with the phase conductor is moved to the open position. In the embodiment of FIG. 5, the interruption 74 on phase conductor 54D results in the isolation switch 68 moving from the closed position to the open position. It should be appreciated that when the isolation switch 68 is moved to the open position, the load connected to the third phase conductor 54D is isolated from the power source. The method 100 then proceeds to block 110 where the bridging switch connected to the phase conductor is moved from the open position to the closed position. In the embodiment of FIG. 6, the second bridging switch 70 is moved to the closed position. When the second bridging switch 70 is closed, electrical power from the second phase conductor 54C will flow to the load that was previously connected to the third phase conductor 54D through the second bridging switch 70.

Figure 4:
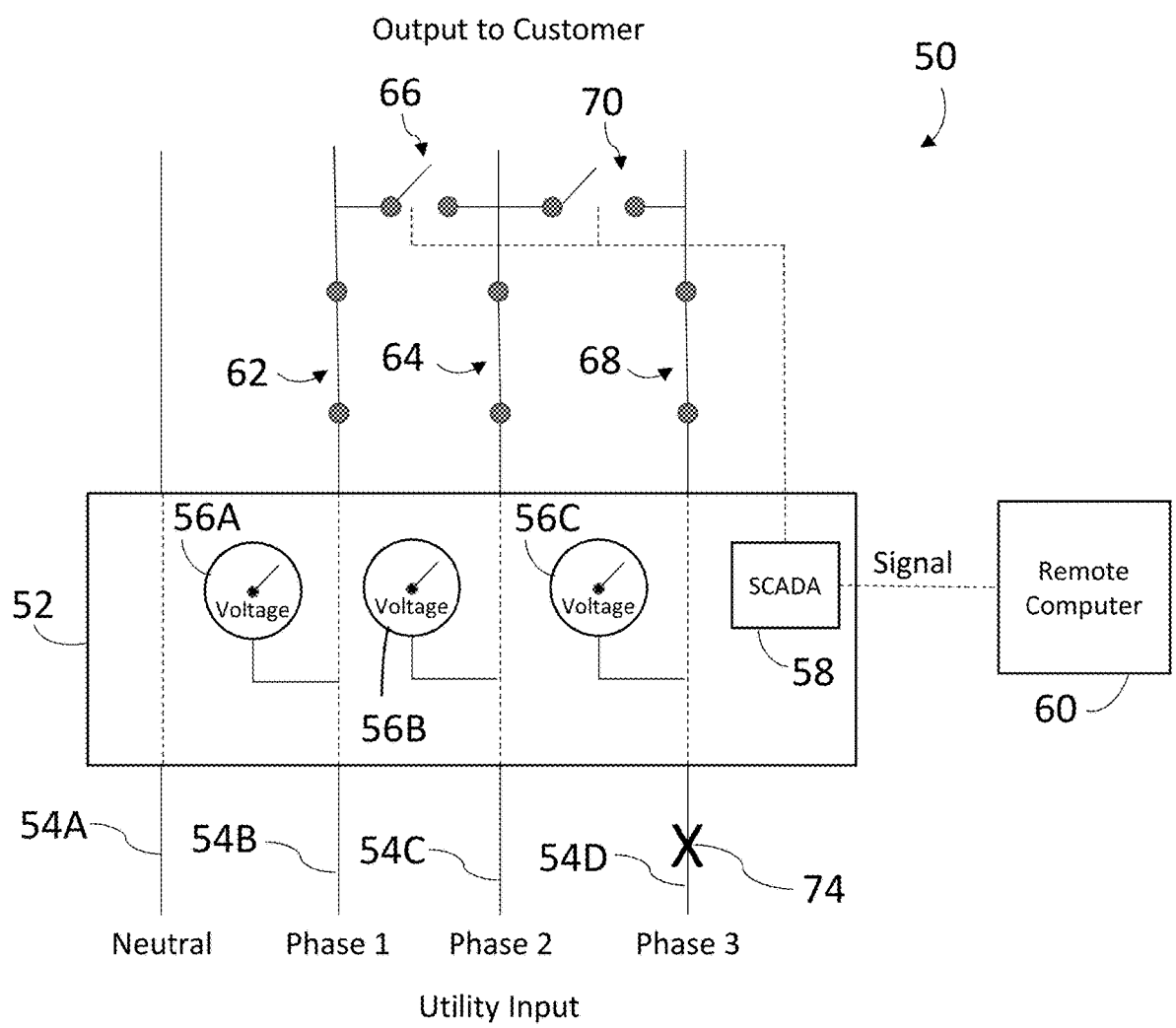
FIGS. 4-6 are schematic illustrations of the electric utility meter of FIG. 3 with a power loss on one phase in accordance with an embodiment.

It should be appreciated that in some instances, two phases may lose electrical power (or an undesired voltage drop). In an embodiment, as long as there is one phase conductor with electrical power, then the remaining phase conductors may be electrically coupled to this phase conductor through the bridging switches to provide electrical power to all of the circuits. In the embodiment of FIGS. 4-6 for example, if a disruption is detected on phase conductors 54D and conductor 54C, the isolation switches 64, 68 may be opened and then the bridging switches 66, 70 closed to provide electrical power from the phase conductor 54B to the other two circuits. It should be appreciated that this method will restore power to customer loads that are connected phase to neutral. Customer loads that are connected line-to-line or three phase such as three-phase motors will not operate. The amount of power supplied by the remaining utility phase/s may be limited by the size of the neutral and phase conductors or by their thermal rating.

It should be appreciated that the system 50 provides advantages in quickly restoring power to the customer that experiences a loss of a single phase of power. In one embodiment, the detection of the interruption 74, the opening of the isolation switch 68 and the closing of the second bridging switch 70 is performed automatically by the controller 58. In another embodiment, upon detecting the interruption 74, the controller 58 transmits a signal to the remote computer 70 to alert utility personnel. The utility personnel may then selectively transmit a signal to the controller 58. The controller 58 then opens the isolation switch 68 and closes the second bridging switch 70.

In an embodiment, the system 50 may include an additional third bridging switch (not shown), that connects the first phase conductor to the third phase conductor. In an embodiment, this may allow the utility personnel to select which of the remaining phase conductors are used to supply electrical power to the load that experienced the interruption.

Once electrical power is flowing through the second bridging switch 79, the method 100 proceeds to query block 112 where the electrical characteristic on the phase conductor that lost electrical power is monitored (e.g. third phase conductor 74). When the query block 112 returns a positive, the method proceeds to block 114 where the second bridge switch 70 is moved from the closed position to the open position. This disconnects and isolates the load from the second phase conductor 54C. With the second bridge switch 70 open, the third isolation switch 68 is moved from the open position to the closed position to reconnect the load with the third phase conductor 54D.

It should be appreciated that while the illustrated embodiment shows the interruption 74 as being on the third phase conductor 54D, this is for exemplary purposes and the claims should not be so limited. The method 100 may be applied no matter which of the electrical phases 54B, 54C, 54D the interruption is detected.

Figure 9:
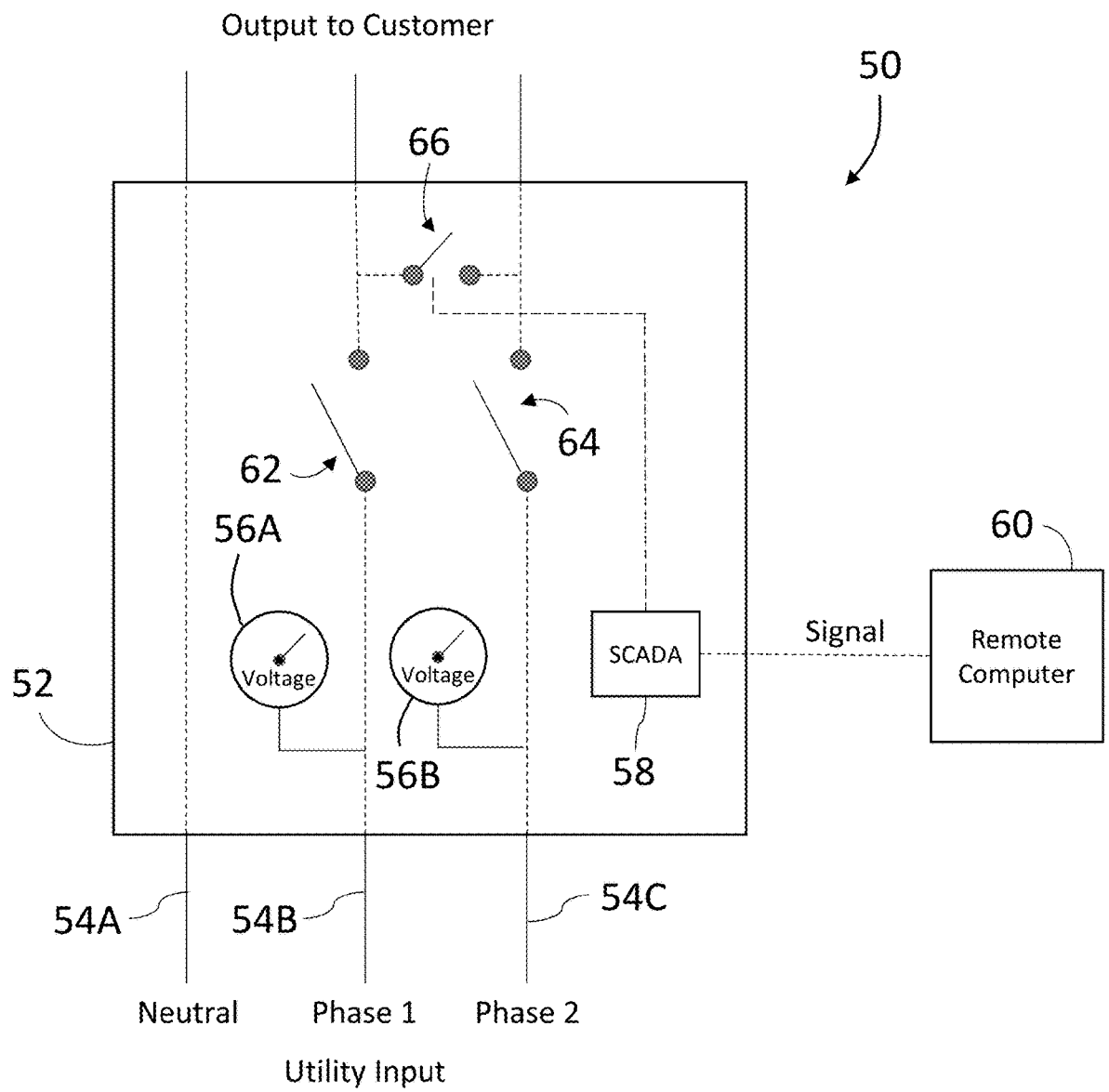
FIG. 9 is a schematic illustration of an electric utility meter having remote bridging capability with the isolation switches and bridging switch being positioned inside of the electrical meter.

It should be appreciated that while the embodiments of FIGS. 1-7 illustrate the isolation switches and bridging switches as being external to the electrical meter, this is for exemplary purposes and the claims should not be so limited. Referring to FIG. 9, in an embodiment the isolation switches 62, 64 and the bridging switch 66 are disposed internal to the housing of the electrical meter. In still other embodiments, one of the isolation switches and bridging switch may be disposed within the housing of the electrical meter and the other of the isolation switches and bridging switch is external to the housing of the electrical meter.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system for controlling delivery of electrical service from a high voltage multi-phase power line of a power plant, through an area substation, to a load,
    wherein the load includes a distributed network configured to receive each phase of the multi-phase electrical service, the system comprising:
    an electric meter configured for being positioned in the area substation and connected on an input side to the power line, thereby connected to each phase of the multi-phase electrical service from the power plant,
    the electric meter connected on an output side to the load,
    the electric meter measures in operation an electrical characteristic comprising an electric voltage of each phase of the multi-phase electrical service, the electric meter further being operable to determine when the electrical characteristic on a first phase and a second phase of the multi-phase electrical service on the input side of the electric meter is below a threshold;
    a first isolation switch electrically coupled to the first phase, on the output side of the electric meter, and arranged to electrically disconnect the first phase from the power plant;
    a second isolation switch electrically coupled to the second phase, on the output side of the electric meter, and arranged to electrically disconnect the second phase from the power plant;
    a bridging switch electrically coupled between the first phase and the second phase, the bridging switch being electrically arranged between the load and both of the first isolation switch and second isolation switch; and
    a controller coupled for communication between the electric meter, the first isolation switch, the second isolation switch, and the bridging switch, the controller including a processor that is responsive to executable computer instructions to cause the first isolation switch to open in response to measuring that the electrical characteristic of the first phase on the input side of the electric meter is below the threshold and causing the bridging switch to close when the first isolation switch is opened.

2. The system of claim 1, wherein the processor is further responsive to transmit a signal to a remote computer in response to the electrical characteristic of the first phase being below the threshold.

3. The system of claim 1, wherein the electric meter includes a first voltage meter electrically coupled to the first phase and a second voltage meter electrically coupled to the second phase.

4. The system of claim 1, wherein the first isolation switch is interlocked with the bridging switch.

5. The system of claim 4, wherein the second isolation switch is interlocked with the bridging switch.

6. A method of delivery of electrical service from a high voltage multi-phase power line of a power plant, through an area substation, to a load,
    wherein the load includes a distributed network configured to receive each phase of the multi-phase electrical service, the method comprising:
    measuring, by an electric meter, an electrical characteristic comprising electric voltage of each phase of the multi-phase electrical service, the plurality of electrical phases including a first phase and a second phase, wherein the electric meter is configured for being positioned in the area substation and connected on an input side to the power line, thereby connected to each phase of the multi-phase electrical service form the power plant;
    determining the electrical characteristic on the first phase, on the input side of the electric meter, is below a threshold;
    opening an isolation switch electrically coupled to the first phase, on the output side of the electric meter, the isolation switch being arranged to electrically disconnect the first phase from the power plant; and
    closing, after the opening of the isolation switch, a bridging switch that is electrically coupled between the first phase and the second phase, the bridging switch being disposed between the isolation switches and the load.

7. The method of claim 6, further comprising transmitting a signal to a remote computer in response to the closing of the bridging switch.

8. The method of claim 6, further comprising interlocking the isolation switch and the bridging switch, wherein the bridging switch will move from an open position to a closed position when the isolation switch is opened and the isolation switch will not move from an open position to a closed position when the bridging switch is in the closed position.

9. A system for controlling delivery of electrical service from a high voltage multi-phase power line of a power plant, through an area substation, to a load,
    wherein the load includes a distributed network configured to receive each phase of the multi-phase electrical service, the system comprising:
    an electric meter configured for being positioned in the area substation and connected on an input side to the power line, thereby connected to each phase of the multi-phase electrical service from the power plant,
    the electrical meter connected on an output side to the load,
    the electric meter measures in operation an electrical characteristic comprising an electric voltage of each phase of the multi-phase electrical service, the electric meter further being operable to determine when the electrical characteristic on a first phase, a second phase, and a third phase of the multi-phase electrical service on the input side of the electric meter is below a threshold;
    a first isolation switch electrically coupled to the first phase, on the output side of the electric meter, and arranged to electrically disconnect the first phase from the power plant;
    a second isolation switch electrically coupled to the second phase, on the output side of the electric meter, and arranged to electrically disconnect the second phase from the power plant;
a third isolation switch electrically coupled to the third phase, on the output side of the electric meter, and arranged to electrically disconnect the third phase from the power plant;
a first bridging switch electrically coupled between the first phase and the second phase, the first bridging switch being electrically arranged between the load and both of the first isolation switch and second isolation switch;
a second bridging switch electrically coupled between the second phase and the third phase, the second bridging switch being electrically arranged between the electric meter and both of the second isolation switch and the third isolation switch; and
a controller coupled for communication between the electric meter, the first isolation switch, the second isolation switch, the third isolation switch, the first bridging switch, and the second bridging switch, the controller including a processor that is responsive to executable computer instructions to cause the first isolation switch to open in response to measuring that the electrical characteristic of the first phase on the input side of electric meter is below the threshold, and causing the first bridging switch to close when the first isolation switch is opened.

10. The system of claim 9, wherein the processor is further responsive to executable computer instructions to cause the second isolation switch to open in response to the electrical characteristic of the second phase being below the threshold and causing the first bridging switch to close when the second isolation switch is opened.

11. The system of claim 10, wherein the processor is further responsive to executable computer instructions to cause the third isolation switch to open in response to the electrical characteristic of the third phase being below the threshold and causing the second bridging switch to close when the third isolation switch is opened.

12. The system of claim 9, wherein the electric meter includes an input and an output, the first isolation switch, the second isolation switch, and the third isolation switch being electrically coupled to the output.

13. The system of claim 9, wherein the electric meter includes a first voltage meter electrically coupled to the first phase, a second voltage meter electrically coupled to the second phase, and a third voltage meter electrically coupled to the third phase.

14. The system of claim 9, wherein the first isolation switch is interlocked with the first bridging switch.

* * * * *